United States Patent
Mutnury et al.

(10) Patent No.: US 10,860,505 B1
(45) Date of Patent: Dec. 8, 2020

(54) SYSTEM AND METHOD FOR ENHANCING RECEIVER EQUALIZATION

(71) Applicant: DELL PRODUCTS, LP, Round Rock, TX (US)

(72) Inventors: Bhyrav M. Mutnury, Austin, TX (US); Stuart A. Berke, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/807,641

(22) Filed: Mar. 3, 2020

(51) Int. Cl.
*G06F 13/16* (2006.01)
*H04B 1/06* (2006.01)
*H04L 25/03* (2006.01)

(52) U.S. Cl.
CPC ........... *G06F 13/1668* (2013.01); *H04B 1/06* (2013.01); *H04L 25/03012* (2013.01)

(58) Field of Classification Search
None
See application file for complete search history.

(56) References Cited

U.S. PATENT DOCUMENTS

| 9,509,532 B2 | 11/2016 | Berke et al. |
| 10,298,421 B2 | 5/2019 | Berke et al. |
| 2018/0321845 A1 | 11/2018 | Mutnury et al. |

*Primary Examiner* — Farley Abad
*Assistant Examiner* — Dayton Lewis-Taylor
(74) *Attorney, Agent, or Firm* — Larson Newman, LLP

(57) ABSTRACT

An information handling system with enhanced receiver equalization may include a processing unit with a dual in-line memory module (DIMM) controller. The DIMM controller is connected to a first DIMM and a second DIMM by a communication channel. A basic input/output system is configured to set an equalization of a data signal on the communication channel by applying a first equalization to a Nyquist frequency that is associated with a data rate of the data signal and by applying a second equalization to a standing wave reflection frequency that is associated with an additional loading in the communication channel. The additional loading may be due to presence of another DIMM in the same communication channel.

20 Claims, 7 Drawing Sheets

SYSTEM AND METHOD FOR ENHANCING RECEIVER EQUALIZATION

FIELD OF THE DISCLOSURE

This disclosure generally relates to information handling systems, and more particularly relates to enhancement of a receiver equalization.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a processing unit with a dual in-line memory module (DIMM) controller and hosts a basic input/output system (BIOS). The DIMM controller is connected to a first DIMM and a second DIMM by a communication channel. The BIOS is configured to set an equalization of a data signal on the communication channel by applying a first equalization to a Nyquist frequency that is associated with a data rate of the data signal and by applying a second equalization to a standing wave reflection frequency that is associated with a trace length between the first DIMM and the second DIMM.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
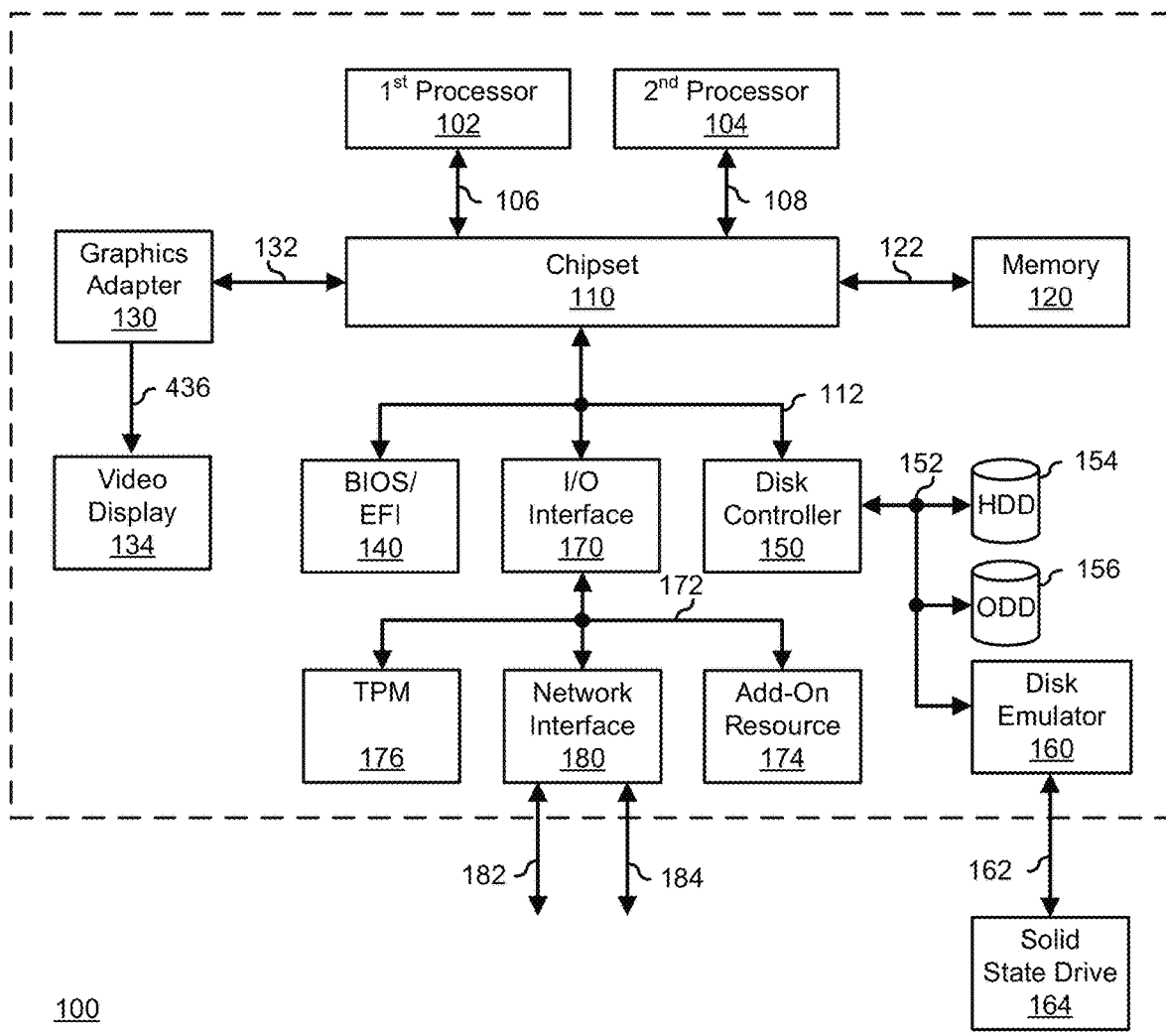
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a processor system which may be a System-on-a-Chip (SoC), a personal computer, a laptop computer, a smart phone, a tablet device or other consumer electronic device, storage array, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as an SoC, or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above. Information handling system 100 includes processors 102 and 104, a chipset 110, a memory 120, a graphics adapter 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics adapter 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer System Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) interface such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a trusted platform module (TPM) 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics adapter, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand™ channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

For the purposes of this disclosure, an example information handling system is a server. The server in turn may include other information handling systems. An example information handling system in a server may be a CPU device including a CPU in communication with one or more memory devices, such as dual in-line memory modules (DIMMs). A DIMM is a memory for data storage that includes a series of dynamic random-access memory integrated circuits. There has been a proliferation of the number of individual DIMMs supported by the CPU. As a result, there has been an increase in the connection length across sets of DIMMs such that the CPU to DIMM connection length increasingly varies. In addition, communication speeds between CPUs and DIMMs are increasing, increasing the difficulty of data transfer due to consequent problems with signal acquisition between DIMM and CPU.

Furthermore, there is also variance among DIMMs because different DIMMs may be manufactured by different manufacturers and used in a single information handling system or model of information handling system. For example, to differentiate DIMMs, DIMM manufacturers sometimes go beyond a DIMM specification to design DIMMs. This could be in terms of raw card improvement or printed circuit board (PCB) material improvement or silicon process improvement, for example. This is usually evident from the laboratory testing on DIMM products. For a given DIMM capacity and rank type, a DIMM manufactured by one DIMM manufacturer is better or a DIMM manufactured by another DIMM manufacturer is worse.

To communicate with DIMMs across all the above variances, equalization of communication channels may be ramped up to maximum to ensure signal and communication acquisition between the CPU and the DIMMs. Thus, the equalization settings in the CPU and the DIMMs may be static, and the equalization settings may be the same for each DIMM. That is, there may be a fixed equalization parameter indiscriminately applied across all DIMMs for the corresponding communication channels. The equalization of the communication channel may include the optimal settings of a transmitter filter in or a receiver filter to compensate for the loss in signal during data transfer. Optimal equalization without over compensating the signal will help both signal integrity and result in power savings. Furthermore, over-equalization of the communication channel relative to an individual DIMM may also diminish signal integrity for signal acquisition. Thus, the signal eye diagram of communications between the CPU and individual DIMM is sub-optimal for both over and under compensation.

Figure 2:
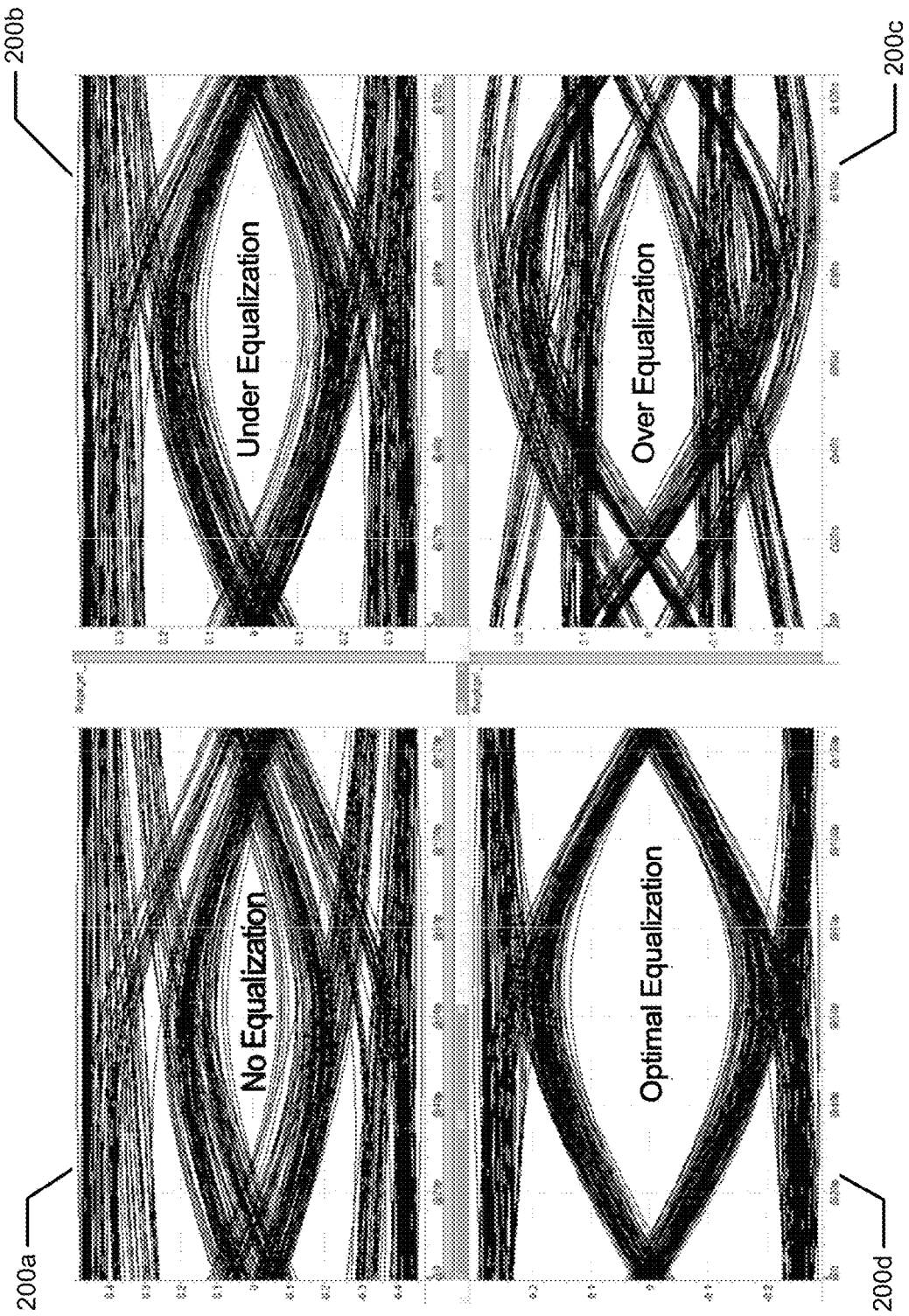
FIG. 2 plots a set of eye diagrams for different channel equalizations according to an embodiment of the present disclosure.

FIG. 2 shows a set of plots 200a-200d indicating various eye diagrams for equalization between a CPU and individual DIMM. In plot 200a, there is no equalization of the communication channel between the CPU and DIMM, and the eye diagram shows a small squinting eye suboptimal for signal acquisition. In plot 200b, there is under equalization of the communication channel between the CPU and DIMM, and the eye diagram shows a small eye suboptimal for signal acquisition. In plot 200c, there is over equalization of the communication channel between the CPU and DIMM, and the eye diagram shows a compressed eye suboptimal for signal acquisition. In plot 200d, there has been an optimized equalization of the communication channel between CPU and DIMM, and the eye diagram shows a wide eye optimal for signal acquisition.

In an embodiment, the equalization settings of the individual communication channel between the CPU and the individual DIMM may be based on individual DIMM characteristics or properties. For example, information such as DIMM serial presence detect (SPD) information may indicate the IO voltage rating, loading capacity, DIMM type, and other DIMM properties. In this example, the SPD information may be stored on the individual DIMM and accessed and used to set the equalization settings for the communication channel between the CPU and the DIMM. In another embodiment, the equalization settings of the individual communication channel between the CPU and the individual DIMM may be based upon presence of standing wave reflections that include unwanted signals due to an impedance mismatch in the connecting communication channel. For example, the impedance mismatch can be generated by a discontinuity in the connecting communication channel. In this example, the discontinuity may be due to presence of another DIMM that can create an additional loading in the same communication channel.

Figure 3:
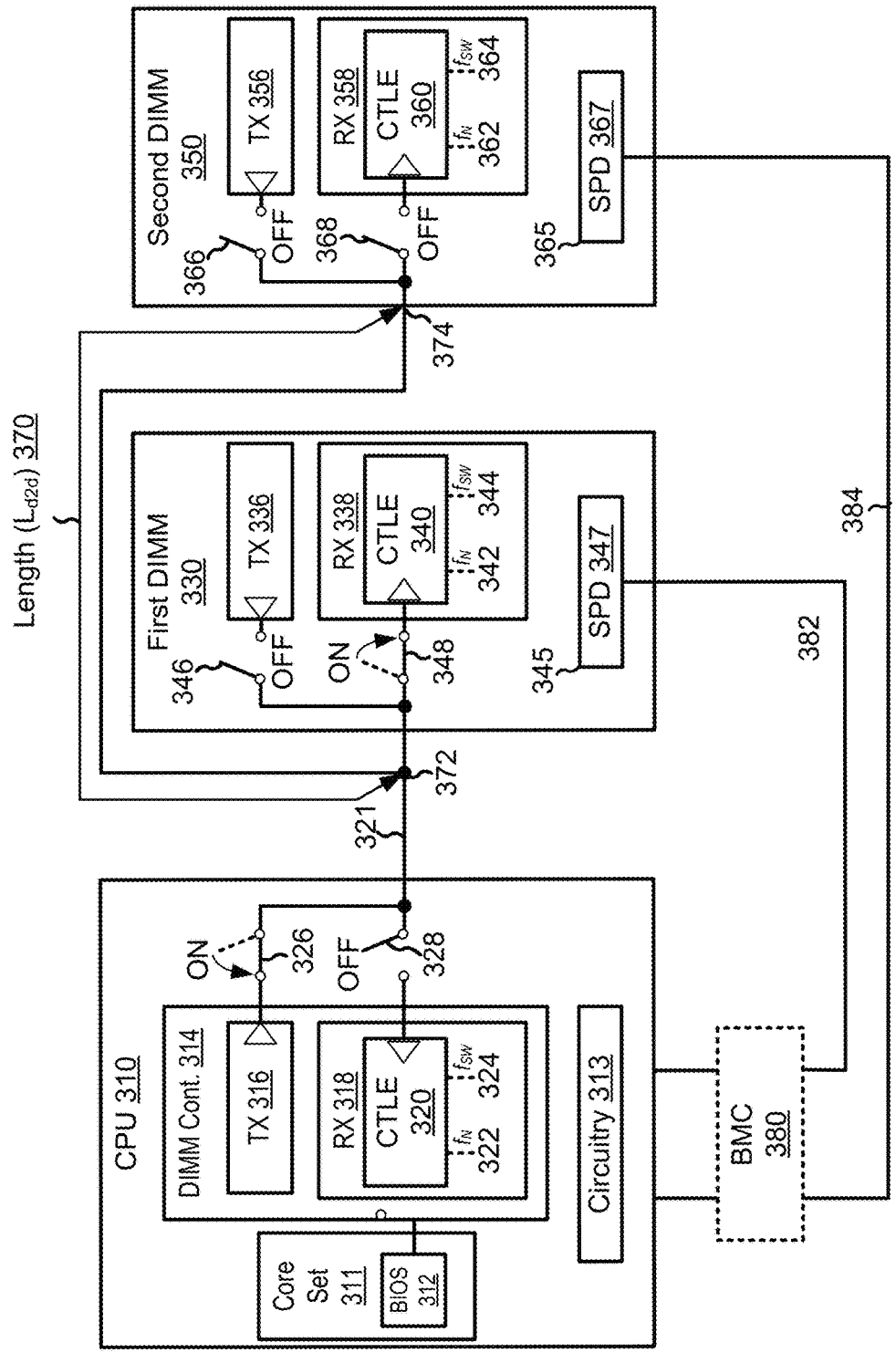
FIG. 3 illustrates an information handling system including a storage system according to an embodiment of the present disclosure.

An example CPU DIMM storage system 300 is shown in FIG. 3. System 300 includes a CPU 310 that may be in communication with a first DIMM 330 and a second DIMM 350 over a communication channel 321. CPU 310 includes a core set 311 which is the set of processor cores of CPU 310. One or more processor cores of the core set 311 may host a Basic Input/Output System (BIOS) 312 of the CPU 310. The BIOS is firmware that can be used to perform hardware initialization during the booting process and provides an abstraction layer for the hardware. CPU 310 includes a CPU circuitry 313 and a memory controller such as a DIMM controller 314. DIMM controller 314 includes a first transmitter component (TX) 316 and a first receiver component (RX) 318 for bidirectional communications with the first DIMM 330 and/or second DIMM 350. The first TX 316 and the second RX 318 may utilize a first TX switch 326 and a first RX switch 328, respectively, to connect with the communication channel 321. The first TX 316 may further include transmitter modules such as a pre-emphasis component that may be adjusted to include one of pre-emphasis settings that can be supported by the first TX. The first RX 318 may include a first continuous time linear equalization (CTLE) module 320 including a Nyquist frequency ($f_N$) control knob 322 and standing wave frequency ($f_{SW}$) control knob 324. The $f_N$ control knob 322 and the $f_{SW}$ control knob 324 may implement equalization settings during data reception by the first RX 318. The CTLE module 320 may be one of the receiver modules in the first RX 318. The other receiver modules of the first RX 318 may include automatic gain control (AGC) and decision feedback equalization (DFE) modules. Further information on the details and operation of the CTLE, AGC, and the DFE modules in a high speed serial channel may be found in U.S. Pat. No. 10,298,421, which is incorporated herein by reference in its entirety.

The first DIMM 330 may include a second TX 336, a second RX 338, and a memory 345. The second TX 336 and the second RX 338 may utilize a second TX switch 346 and a second RX switch 348, respectively, to connect with the communication channel 321. The second TX 336 may further include transmitter modules such as the de-emphasis component that may be adjusted to include one of de-emphasis settings that can be supported by the second TX. The second RX 338 may include a CTLE module 340 including $f_N$ control knob 342 and a $f_{SW}$ control knob 344. The $f_N$ control knob 342 and the $f_{SW}$ control knob 344 may implement equalization settings during data reception by the second RX 338. The CTLE module 320 may be one of the receiver modules in the first RX 318. The other receiver modules of the first RX 318 may include AGC and DFE modules. Similarly, the second DIMM 350 may include a third TX 356, a third RX 358, and a memory 365. The third TX 356 and the third RX 358 may utilize a third TX switch 366 and a third RX switch 368, respectively, to connect with the communication channel 321. The third TX 356 may further include transmitter modules while the third RX 358 may include a CTLE module 360 including a $f_N$ control knob 362 and a $f_{SW}$ control knob 364. The $f_N$ control knob 362 and the $f_{SW}$ control knob 364 may implement equalization settings during data reception by the third RX 358.

The first DIMM 330 and the second DIMM 350 may form a DIMM pair and are connected to the CPU 310 generally, and to the DIMM controller 314 particularly, by the communication channel 321. CPU 310 may access the first DIMM 330 and the second DIMM 350 over the communication channel 321 with the communication channel extended to a trace length 370 between the first DIMM 330 and the second DIMM 350. That is, the length 370 may include the physical length of a conductive trace between a first point 372 at the side of the first DIMM 330 and a second point 374 at the side of the second DIMM 350. Communications between the CPU 310 and the first and second DIMMs may be according to the double data rate fourth-generation (DDR4) standard, double data rate fifth-generation (DDR5) standard, or variants thereof.

The memory 345 may be an erasable programmable read-only memory (EPROM) or other non-volatile memory that stores SPD information 347 for the first DIMM 330. Similarly, the memory 365 may be an EPROM or other non-volatile memory that stores SPD information 367 for the second DIMM 350. When the storage system 300 is part of a server, a server baseboard management controller (BMC) 380 may be connected to memories 345 and 365 through channels 382 and 384, respectively. The BMC 380 may access the SPD information for the first DIMM 330 and the second DIMM 350 in memories 328 and 338, respectively, and provide the obtained SPD information to the CPU 310 and particularly, the BIOS 312. With the obtained SPD information, the BIOS 312 and/or the DIMM controller 314 may configure each TX and RX of the DIMM controller 314, first DIMM 330, and the second DIMM 350 to provide a desired equalization of the communication channel 321 based on the individual SPD information.

In an embodiment, the CPU 310 may transmit data to the first DIMM 330 by closing the first TX switch 326 and the second RX switch 348, and leaving the rest of the TX and RX switches disconnected from the communication channel 321. In this embodiment, the hanging second DIMM 350 may create discontinuity and additional loading that generate standing wave reflections in the same communication channel 321. The created discontinuity produces the impedance mismatch that may correspond to the length 370 of the communication channel between the first DIMM 330 and the second DIMM 350. In this case, the equalization settings at the CTLE module 340 of the first DIMM 330 may include amplification of a frequency of interest between the CPU 310 and the first DIMM 330, and suppression of the standing wave reflections between the first DIMM 330 and the second DIMM 350. The amplification of frequency of interest may be implemented by adjusting the $f_N$ knob 342 while the suppression of the standing wave reflections may be performed by varying settings of the $f_{SW}$ knob 344. The equalization settings in the first DIMM 330 may be performed during initialization of the information handling system or upon connecting of the first DIMM 330 to the CPU 310. The transmission of data by the CPU 310 to the first DIMM 330 may represent one half of a bi-directional serial data link for communicating data. The other half of the bi-directional data link may include, for example, the first DIMM 330 transmitting data back to the CPU 310.

The BIOS 312 may set up the equalization settings of the CTLEs 320, 340, and 360 based upon predetermined amount of standing wave reflections in the system 300. In an embodiment and in the case of data transfer from the CPU 310 to the first DIMM 330 only, a data signal frequency response of the communication channel 321 may include the frequency of interest and the standing wave reflection in the same communication channel. The frequency of interest may include the Nyquist frequency which is associated with data rate in the communication channel and can include a value of half of a sampling rate. The standing wave reflection includes unwanted portions of the data signal due to presence of the second DIMM 350. The frequency of interest includes a first set of signal components that are within a particular bandwidth at the Nyquist frequency of the data signal. The unwanted portion includes a second set of signal components that are within a different bandwidth at a resonant frequency of the standing wave reflection. The resonant frequency or standing wave reflection frequency includes the unwanted signals due to presence of additional loading in the same communication channel 321. For example, the additional loading may be based from portions of the communication channel 321 that connects the first point 372 to second point 374. In this example, the length 370 of the communication channel 321 may generate the discontinuity or the additional loading in the same communication channel 321.

In some embodiments, the CPU 310 and particularly the DIMM controller 314 may be configured to determine the Nyquist frequency and the resonant frequency of the data signal frequency response for the data transfer between the CPU 310 and the first DIMM 330. In this embodiment, the $f_N$ knob 342 and $f_{SW}$ knob 244 may be preconfigured to include equalization settings based upon the determined Nyquist frequency and the determined resonant frequency, respectively, in the communication channel 321. In another embodiment, the CPU 310 characterizes the communication channel 321 and based upon the characterization, the $f_N$ knob 342 and $f_{SW}$ knob 244 may be dynamically adjusted. In another embodiment, the configuration of the $f_N$ knob 342 and $f_{SW}$ knob 244 may be further based upon the obtained SPD 347. In these embodiments, the configuration of the $f_N$ knob 342 may amplify the determined Nyquist frequency while the configuration of the $f_{SW}$ knob 342 may suppress the standing wave reflection frequency. The amplification and the suppression may be implemented using a transfer function of the CTLE 340.

The transfer function of the CTLE 340 may include an application of a first equalization and a second equalization to the signal components at the Nyquist frequency and the resonant frequency, respectively. The first equalization may be used to amplify the first set of signal components within a particular bandwidth at the Nyquist frequency. The second equalization may be used to suppress the second set of signal components of a different bandwidth and around the resonant frequency. For example, the first equalization may include a first set of poles and zero that coincide with the Nyquist frequency. In this example, the transfer function of the CTLE 340 to implement the first equalization is given in equation 1 (Eq. 1) below:

$$H(s) = \frac{\left(\frac{s}{w_z} + 1\right)}{\left(\frac{s}{w_{p1}} + 1\right) * \left(\frac{s}{w_{p2}} + 1\right)} A_{DC} \tag{1}$$

where H(s) is the transfer function of the CTLE corresponding to the first equalization to amplify the first set of signal components within a certain bandwidth at Nyquist frequency, $w_z$ is a first zero that can provide high-frequency boost to open signal eye, $w_{p1}$ is the first pole that can provide a peak of signal eye, $w_{p2}$ is the second pole that can limit the bandwidth, $A_{DC}$ includes an amplification gain, and s is a complex frequency.

From Eq. 1, the numerator polynomial can be set to zero to determine the root $w_z$. Similarly, the denominator polynomial can be set to zero to determine the poles $w_{p1}$ and $w_{p2}$. In an embodiment, the first set of roots $w_z$, $w_{p1}$ and $w_{p2}$ coincide with the Nyquist frequency to amplify the first set of signal components. In this embodiment, the first set of roots includes the first set of poles and zero for the first equalization. In other embodiments, the amplification gain $A_{DC}$ is adjusted to minimize power consumption of the storage system 300. In this other embodiment, the first set of roots $w_z$, $w_{p1}$ and $w_{p2}$ may be adjusted correspondingly to generate the same amount of first equalization but with a lower amplification gain.

To suppress the second set of signal components at the resonant frequency, a second set of poles and zero for the second equalization may be added to the first set of poles and zero of the first equalization. For example, the CTLE 340 may utilize equation 2 (Eq. 2) below to obtain a new transfer function for the equalization of the communication channel 321:

$$H_{new}(s) = \frac{\left(\frac{s}{w_z} + 1\right)}{\left(\frac{s}{w_{p1}} + 1\right) * \left(\frac{s}{w_{p2}} + 1\right)} A_{DC} + \frac{\left(\frac{s}{w_{zd}} + 1\right)}{\left(\frac{s}{w_{pd1}} + 1\right) * \left(\frac{s}{w_{pd2}} + 1\right)} A_{DC2} \tag{2}$$

where $H_{new\,(s)}$ is the new transfer function that combines the first equalization and the second equalization, $w_{zd}$ is a first zero for the second equalization, $w_{pd1}$ is the first pole for the second equalization, $w_{pd2}$ is the second pole for the second equalization, and $A_{DC2}$ is an amplification gain for the second equalization. The first part of the Hnew(s) is the same as the first equalization in Eq. 1 while the second part includes the additional equalization that may be referred herein as the second equalization. A combination of the first part and the second part provides the new transfer function Hnew(s) to address the presence of the standing wave reflection in the communication channel 321.

From Eq. 2, the numerator polynomial of the second part is set to zero to determine the root $w_{zd}$ of the second equalization. Similarly, the denominator polynomial of the second part is set to zero to determine the roots $w_{pd1}$ and $w_{pd2}$ of the second equalization. In an embodiment, the second set of roots $w_{zd}$, $w_{pd1}$ and $w_{pd2}$ suppress the standing wave reflection signal by decreasing the magnitude of the signal components at the standing wave reflection frequency. In this embodiment, the second set of roots includes the second set of poles and zero for the second equalization. The second set of poles and zero may coincide with the standing wave reflection frequency to suppress the standing wave reflection frequency.

In an embodiment, the resonant frequency of the standing wave reflection during the data transfer between the CPU 310 and the first DIMM 330 can be derived using equation 3 (Eq. 3) below:

$$f = \frac{c}{\sqrt{\epsilon_r}} \frac{1}{4 * L_{d2d}} \quad (3)$$

where f is the resonant frequency of the communication channel 321 when the third TX switch 366 and third RX switch 368 are left open while the first TX switch 326 and the second RX switch 348 switches are closed, C is speed of light, $\epsilon_r$ is dielectric constant, and Ld2d is physical length or the length 370 between the first DIMM 330 and the second DIMM 350. With the obtained resonant frequency, the DIMM controller 314 may use the $f_{SW}$ knob 344 to suppress the standing wave reflection frequency. For example, each of the $f_N$ knob 342 and the $f_{SW}$ knob 344 can support 21 equalizations setting or levels, which each prescribe a different amount of equalization from 0 dB to 10 dB, in 0.5 dB steps. In this example, the $f_{SW}$ knob 344 may be adjusted to the level that corresponds to the determined resonant frequency in Eq. 3.

Figure 4:
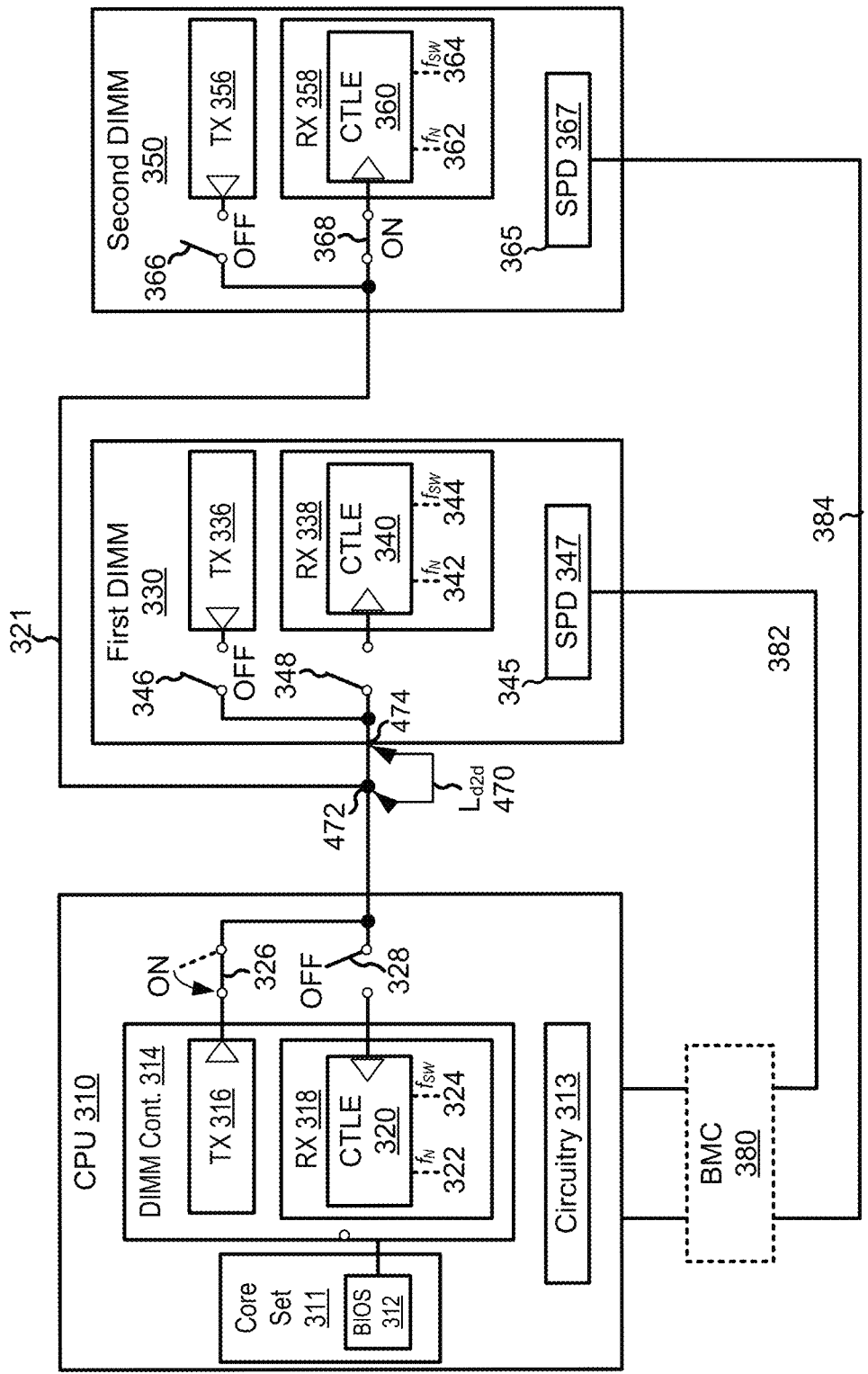
FIG. 4 illustrates a different configuration of the storage system according to an embodiment of the present disclosure.

FIG. 4 shows a block diagram of the CPU DIMM storage system 400 including the CPU 310 that may be configured to transfer data to the second DIMM 350. The operation and components of the system 400 and the system 300 are the same except that the system 400 may be configured to have the first TX switch 326 and the third RX switch 368 turned ON while the rest of the first switch RX 328, second TX switch 346, second RX switch 348, and the third TX switch 366 may be left in open circuit. Furthermore, a new communication channel length 470 between a first point 472 and a second point 474 may be used to calculate the resonant frequency using Eq. 3.

In an embodiment and for the data transfer between the CPU 310 and the second DIMM 350, the equalization settings of the CTLE 360 may be configured based upon the impedance mismatch in the communication channel 321. The impedance mismatch, for example, may be derived by determining the resonant frequency based on the new length 470. In this example, the DIMM controller 314 may use the $f_N$ knob 362 and the $f_{SW}$ knob 364 to amplify the Nyquist frequency and to suppress the determined resonant frequency, respectively.

In other embodiments, the amplification gain of the CTLE 360 may be adjusted based upon the determined resonant frequency. In this embodiment, the adjustment of the amplification gain may be combined with the variation in the settings of the $f_N$ knob 362 and the $f_{SW}$ knob 364 to obtain the desired equalization setting. In another embodiment such as where the second DIMM 350 is transmitting data back to the CPU 310, the $f_N$ knob 322 and the $f_{SW}$ knob 324 of the CTLE 320 may be adjusted to configure equalization settings of the receiving first RX 318.

Figure 5:
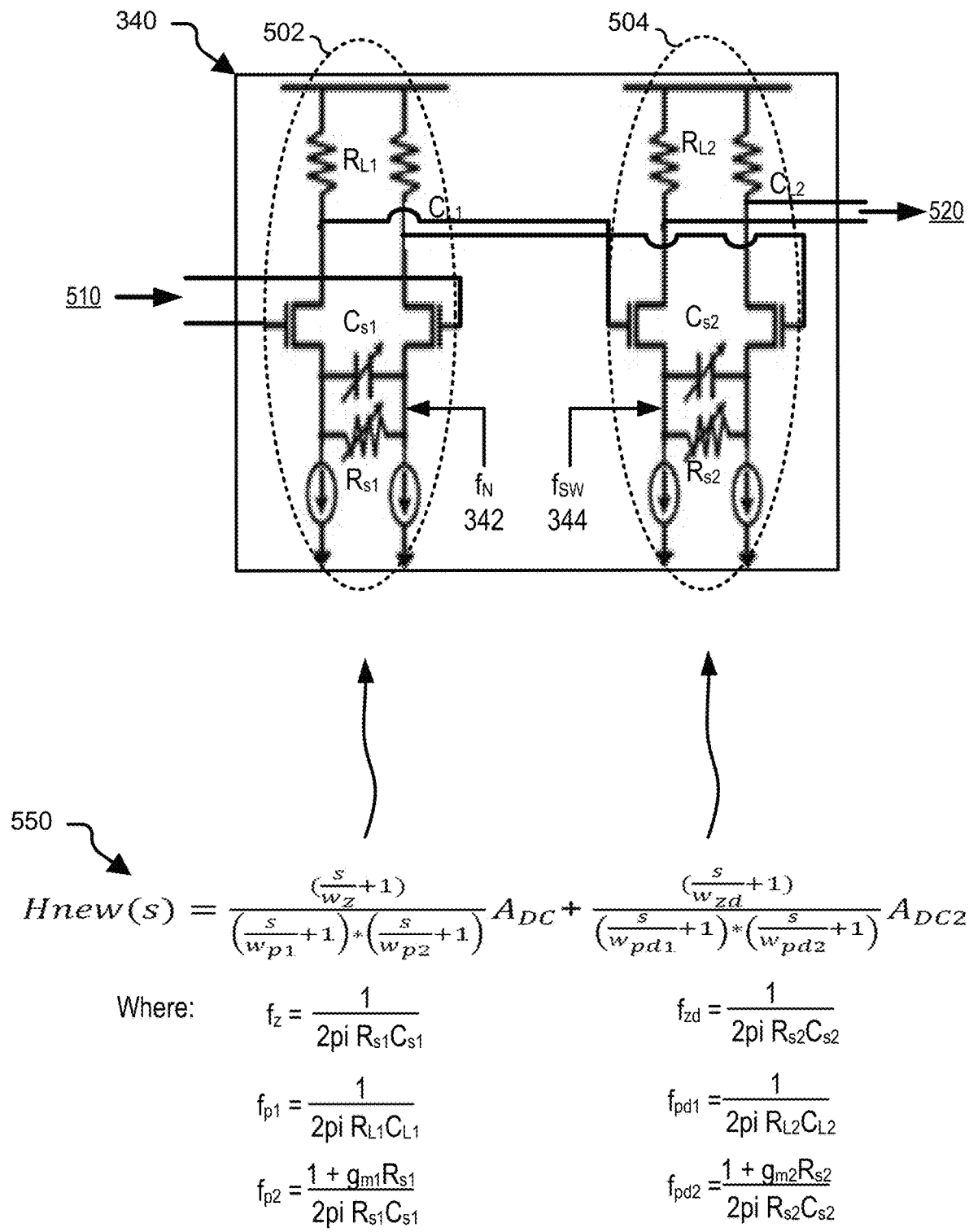
FIG. 5 illustrates a block diagram of a receiver module and its equivalent transfer function according to an embodiment of the present disclosure.

FIG. 5 shows a block diagram of the CTLE 340 including an equivalent transfer function 550. In an embodiment and during the data transfer from the CPU 310 to the first DIMM 330, the CTLE 340 may receive an input data signal 510 from the communication channel 321. In this embodiment, the received data signal 510 undergoes the transfer function 550 to generate an output signal 520, and the output signal may be further processed by another receiver module such as the AGC. The CTLE 340 includes a first portion 502 that is cascaded to a second portion 504. The first portion 502 and the second portion 504 may be configured to implement the first equalization on the Nyquist frequency and the second equalization on the standing wave reflection frequency, respectively. For example, the first portion 502 includes the $f_N$ knob 342 that may be configured to adjust the resistor (Rs1) and capacitor (Cs1) components to generate the first set of roots $w_z$, $w_{p1}$ and $w_{p2}$ that coincide with the Nyquist frequency. In this example, the first portion 502 of the receiver CTLE module 500 may be used to amplify the first set of signal components at the Nyquist frequency. Similarly, the second portion 504 includes the $f_{SW}$ knob 344 that may be configured to adjust a separate resistor (Rs2) and another capacitor (Cs2) components to generate the second set of roots $w_{zd}$, $w_{pd1}$ and $w_{pd2}$ for suppressing of the signal components at and around the standing wave reflection frequency. By cascading the first portion 502 to the second portion 504, the output 530 generates improved signal acquisition of the data signal in the same communication channel 321. Approximations of the values for the first set of roots and the second set of roots are shown under the transfer function equation. The approximated values may be used by the $f_N$ knob 322 and the $f_{SW}$ knob 324 to adjust the step or level of the equalization settings.

In other embodiments, the first portion 502 and the second portion 504 are integrated as a single component to minimize number of components in the circuit.

Figure 6:
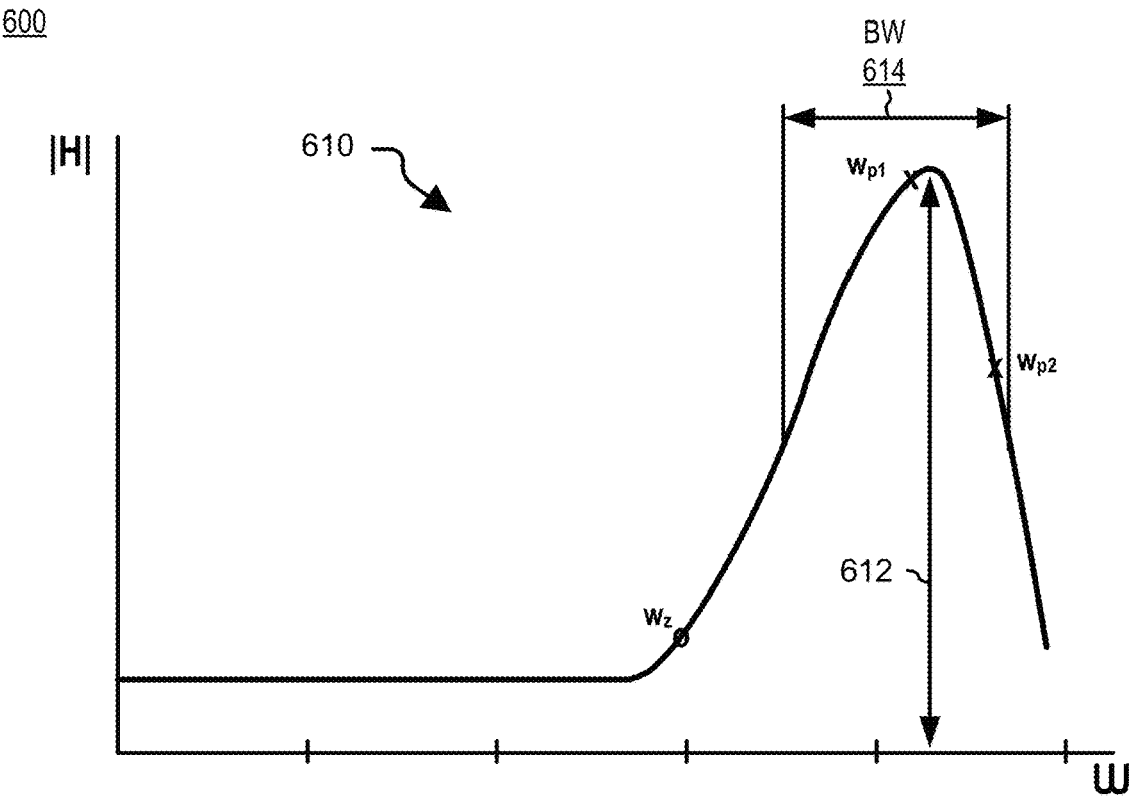
FIG. 6 illustrates data signal frequency responses according to an embodiment of the present disclosure.
Figure 6:
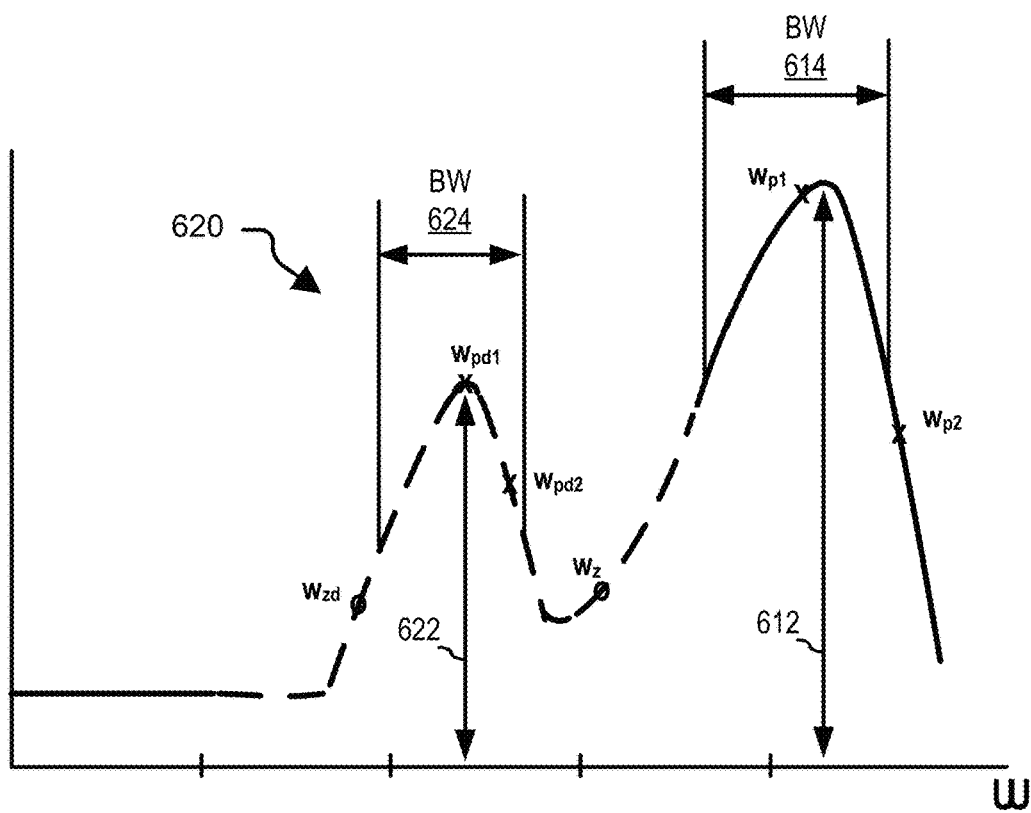

FIG. 6 shows a set of frequency response graph 600 of the data signal during the data transfer between the CPU 310 and the first DIMM 330. The graph 600 illustrates a first frequency response graph 610 that includes the ideal no impedance mismatches in the communication channel 321. That is, the graph 610 only includes a Nyquist frequency 612 with a bandwidth 614. In this case, only the first equalization may be utilized by the CTLE 340 to amplify the Nyquist frequency 612. The first equalization includes the first set of roots $w_{p1}$ and $w_{p2}$, and $w_z$ that coincide with the Nyquist frequency 612. The zero $w_z$ may be used to increase gain |H| while the poles $w_{p1}$ and $w_{p2}$ may be used to obtain the peak value and to limit the bandwidth 614, respectively. In some embodiments, the amplified signal components within the bandwidth 614 include the frequency of interest for purposes of improving the signal acquisition.

Figure 7:
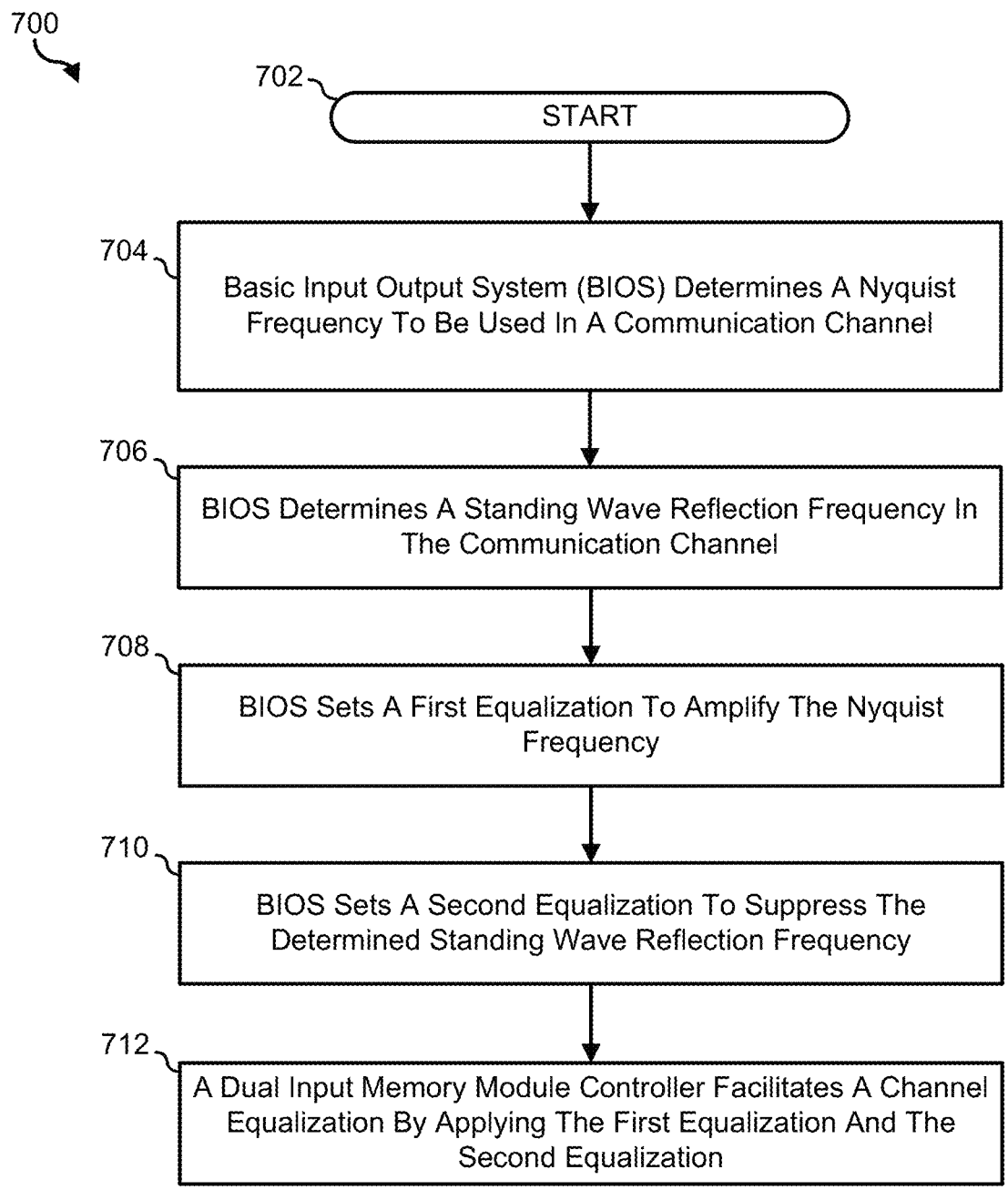
FIG. 7 is a flowchart showing a method for enhancing receiver equalization according to an embodiment of the present disclosure.

The graph 600 further shows a second frequency response graph 620 including the Nyquist frequency 612, a resonant frequency 622, and a bandwidth 624. For example, the resonant frequency 622 may be generated by the length 370 of the communication channel 321. The length 370 includes the physical length of the communication channel 321 that was left hanging due to the open third switch 368. In this example, the combination of the first and second equalizations may be utilized by the CTLE 340 to improve signal acquisition. The first equalization includes the first set of roots $w_{p1}$ and $w_{p2}$, and $w_z$ that coincide with the Nyquist frequency 612 to amplify the frequency of interest. The second equalization includes the second set of roots $w_{pd1}$ and $w_{pd2}$, and $w_{zd}$ that may be used to suppress the signal components at and around the standing wave reflection frequency 622. The zero $w_{zd}$ may be used to decrease the gain |H| while the poles $w_{p1}$ and $w_{p2}$ may be used to obtain the peak value and to define the bandwidth 624, respectively. In some embodiments, the suppressed signal components within the bandwidth 624 include the unwanted standing wave reflections for purposes of improving the signal acquisition FIG. 7 shows a flowchart of a process 700 for setting the CTLE receiver module of the receiving DIMM, starting at block 702. At block 704, the BIOS 312 determines the Nyquist frequency to be used in the communication channel 321. For example and for the data transfer between the CPU 310 and the first DIMM 330, the BIOS 312 may determine the Nyquist frequency to be used as the data rate in the data transfer. At block 706, the BIOS determines the standing wave reflection frequency in the communication channel. For example, the standing wave reflection frequency may be calculated using Eq. 3. At block 708, the BIOS sets a first equalization to amplify the Nyquist frequency. For example, the first equalization includes the first part of the $H_{new(s)}$ in Eq. 2. At block 710, the BIOS sets a second equalization to suppress the determined standing wave reflection frequency. For example, the second equalization includes the second part of the $H_{new(s)}$ in Eq. 2. At block 712, the DIMM controller facilitates channel equalization by applying the first equalization to the Nyquist frequency and by applying the second equalization to the determined standing wave reflection frequency.

Processes 700 may be performed at an initialization of an information handling system such as a server including the CPU with DIMMs or upon connecting one or more DIMMs to the CPU. Thus there may be dynamic and individual setting of communication channel equalization of individual communication channels.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function, and equivalents thereof.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest reasonable interpretation of the following claims and their equivalents, and shall not be restricted or limited by the foregoing detailed description.

What is claimed is:

1. An information handling system with enhanced receiver equalization, the information handling system comprising:
    a processing unit with a dual in-line memory module (DIMM) controller and hosting a basic input/output system (BIOS);
    a first DIMM connected to the DIMM controller by a communication channel; and
    a second DIMM connected to the DIMM controller by the communication channel,
    wherein the BIOS is configured to set an equalization of a data signal on the communication channel by applying a first equalization to a Nyquist frequency associated with a data rate of the data signal and a second equalization to a standing wave reflection frequency associated with a trace length between the first DIMM and the second DIMM.

2. The information handling system of claim 1, wherein the equalization is implemented by a continuous time linear equalization (CTLE) module of a receiving DIMM controller, first DIMM, or second DIMM, wherein the CTLE module includes a transfer function that implements the first equalization and the second equalization.

3. The information handling system of claim 2, wherein the CTLE module further includes a Nyquist frequency knob that is configured to adjust resistor and capacitor components of the CTLE module to implement the first equalization.

4. The information handling system of claim 3, wherein the adjustment of the Nyquist frequency knob configures a first set of roots of the transfer function to coincide with the Nyquist frequency.

5. The information handling system of claim 4, wherein the coinciding first set of roots include a pair of poles and a zero that are used to increase a gain of signal components within a first bandwidth at the Nyquist frequency.

6. The information handling system of claim 2, wherein the CTLE module further includes a standing wave frequency knob that is configured to adjust resistor and capacitor components of the CTLE module to implement the second equalization.

7. The information handling system of claim 6, wherein the adjustment of the standing wave frequency knob configures a second set of roots of the transfer function to coincide with the determined standing wave reflection frequency.

8. The information handling system of claim 7, wherein the coinciding second set of roots include a pair of poles and a zero that are used to decrease a gain of signal components within a second bandwidth at the standing wave reflection frequency.

9. The information handling system of claim 1, wherein the determined standing wave reflection frequency is based upon a discontinuity in the communication channel.

10. The information handling system of claim 9, wherein the discontinuity in the communication channel during a data transfer between the CPU and the first DIMM is different from the discontinuity in the communication channel during the data transfer between the CPU and the second DIMM.

11. A method, comprising:
    setting, by a basic input/output system, an equalization of a data signal in a communication channel that connects a dual in-line memory module (DIMM) controller to a first DIMM and a second DIMM, wherein the equalization includes a first equalization and a second equalization;
    applying the first equalization to a Nyquist frequency that is associated with a data rate of the data signal; and
    applying the second equalization to a standing wave reflection frequency that is associated with a trace length between the first DIMM and the second DIMM.

12. The method of claim 11, wherein the setting is performed during an initialization of an information handling system.

13. The method of claim 11, wherein the applying of the first equalization includes adjusting of a Nyquist frequency knob to amplify the Nyquist frequency.

14. The method of claim 13, wherein the amplification of the Nyquist frequency includes a first set of roots of the transfer function that coincide with the Nyquist frequency.

15. The method of claim 11, wherein the applying of the second equalization includes adjusting of a standing wave frequency knob to suppress signal components at the determined standing wave reflection frequency.

16. The method of claim 11, wherein the determined standing wave reflection frequency is based upon an additional loading in the communication channel.

17. The method of claim 16, wherein the additional loading in the communication channel during a data transfer between the CPU and the first DIMM is different from the additional loading in the communication channel during the data transfer between the CPU and the second DIMM.

18. An information handling system, comprising:
a processing unit with a dual in-line memory module (DIMM) controller and hosting a basic input/output system (BIOS);
a first DIMM connected to the DIMM controller by a communication channel; and
a second DIMM connected to the DIMM controller by the communication channel,
wherein the BIOS is configured to set an equalization of the data signal on the communication channel during an initialization of the information handling system, and wherein the equalization includes applying a first equalization to a Nyquist frequency associated with a data rate of the data signal and a second equalization to a resonant frequency associated with an additional loading in the communication channel.

19. The information handling system of claim 18, wherein the first equalization amplifies signal components at the Nyquist frequency.

20. The information handling system of claim 18, wherein the second equalization suppresses signal components at the resonant frequency.

* * * * *